US009018929B2

(12) United States Patent
Isham (10) Patent No.: US 9,018,929 B2
(45) Date of Patent: Apr. 28, 2015

(54) INTERNAL COMPENSATION FOR POWER MANAGEMENT INTEGRATED CIRCUITS

(71) Applicant: Intersil Americas LLC, Milpitas, CA (US)

(72) Inventor: Robert H. Isham, Flemington, NJ (US)

(73) Assignee: Intersil Americas LLC, Milpitas, CA (US)

( * ) Notice: Subject to any disclaimer, the term of this patent is extended or adjusted under 35 U.S.C. 154(b) by 148 days.

(21) Appl. No.: 13/851,624

(22) Filed: Mar. 27, 2013

(65) Prior Publication Data

US 2014/0266093 A1     Sep. 18, 2014

Related U.S. Application Data

(60) Provisional application No. 61/798,579, filed on Mar. 15, 2013.

(51) Int. Cl.
| H02M 3/157 | (2006.01) |
| H02M 3/158 | (2006.01) |
| G05F 1/648 | (2006.01) |
| H02M 1/00 | (2006.01) |

(52) U.S. Cl.
CPC .............. *H02M 3/157* (2013.01); *H02M 3/158* (2013.01); *H02M 2001/0025* (2013.01)

(58) Field of Classification Search
CPC ............ H02M 3/06; H02M 3/07; G05F 1/652
USPC ................... 323/282, 283, 297, 298, 353, 354
See application file for complete search history.

(56) References Cited

U.S. PATENT DOCUMENTS

| 5,382,918 A | 1/1995 | Yamatake |
| 5,514,947 A | 5/1996 | Berg |
| 6,344,772 B1 | 2/2002 | Larsson |
| 6,724,257 B2 | 4/2004 | Wrathall |
| 7,518,428 B2 | 4/2009 | Ichiba et al. |
| 8,786,268 B2 * | 7/2014 | Li et al. .......................... 323/285 |
| 2012/0139519 A1 * | 6/2012 | Dearborn ...................... 323/290 |
| 2014/0266120 A1 | 9/2014 | Isham |

OTHER PUBLICATIONS

"Chapter 9: Power Management", "Basic Linear Design", Jan. 12, 2007, pp. 1-98.
Wang, "Passive Components: Use Filter Capacitors in Linear Voltage Regulators", Aug. 2007, pp. 1-3, Publisher: www.eetasia.com.

(Continued)

*Primary Examiner* — Gary L Laxton
(74) *Attorney, Agent, or Firm* — Fogg & Powers LLC (57) ABSTRACT

A voltage regulator integrated circuit comprises a control circuit driving at least one power switch to provide a regulated voltage at an output of an inductor/capacitor (LC) circuit coupled to the at least one power switch; an error amplifier having a first input coupled to a feedback signal representative of the regulated output voltage and a second input coupled to a reference signal; and a compensation network coupled to an output of the error amplifier and configured to provide a compensation voltage. The compensation network includes at least one digitally programmable resistor array and at least one digitally programmable capacitor array. Each array provides a plurality of user selectable component values. The control circuit includes a pulse modulator configured to modulate an input voltage based on the compensation voltage.

20 Claims, 4 Drawing Sheets

(56) References Cited

OTHER PUBLICATIONS

Rose, "Compensation Methods in Voltage Regulators: An Evolution from Analog to Digital", Nov. 2012, pp. 1-5, Publisher: CUI Inc.

Mattingly, "Designing Stable Compensations Networks for Single Phase Voltage Mode Buck Regulators", "Technical Brief TB417.1", Dec. 2003, pp. 1-10, Publisher: Intersil.

* cited by examiner

INTERNAL COMPENSATION FOR POWER MANAGEMENT INTEGRATED CIRCUITS

CROSS-REFERENCE TO RELATED APPLICATIONS

This application claims priority to U.S. provisional patent application Ser. No. 61/798,579 entitled "INTERNAL COMPENSATION FOR POWER MANAGEMENT INTEGRATED CIRCUITS," filed on Mar. 15, 2013, which is hereby incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
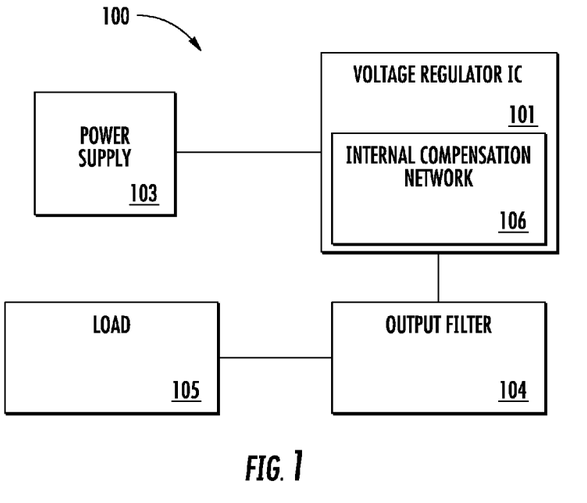
FIG. 1 is a block diagram of one embodiment of an exemplary system.

FIG. 1 is a block diagram of one embodiment of a system 100 utilizing a voltage regulator integrated circuit (IC) 101 which has an internal analog compensation network 106. As used in this context, the term 'internal' refers to being a component located inside the integrated circuit rather than an external component which is coupled to the integrated circuit through a pin or input. The system 100 also includes a power source 103, an output filter 104, and a load 105. The load 105 draws power from the power source 103 via the voltage regulator IC 101 and the output filter 104. For example, the load 105 can be implemented as, but is not limited to, one or more of a processor (e.g. a microprocessor, digital signal processor, embedded processor, etc.), a display device (e.g. a light-emitting diode or LED display, a cathode ray tube or CRT display, a liquid crystal display or LCD, etc.), a memory device (e.g. conventional hard disk, Electrically Erasable Programmable ROM or EEPROM, flash memory, etc.), or other applicable peripheral devices, as known to one of skill in the art. Additionally, the power source 103 can be implemented as, but is not limited to, a conventional Alternating Current (AC) to Direct Current (DC) power supply or battery.

The internal compensation network 106 is configured to enable a user to conveniently tune the performance of the compensation network via an input on the integrated circuit, as described in more detail below. For example, a user is able to tune the performance without having to solder or re-solder external components as in conventional voltage regulators having an external compensation network. However, the internal compensation network 106 described herein still enables similar configuration/tuning capabilities as conventional external compensation networks. In this way, the internal compensation network 106 reduces the number of external components of the switching voltage regulator as well as the time and complexity involved in tuning the performance as compared to an external compensation network.

Figure 2:
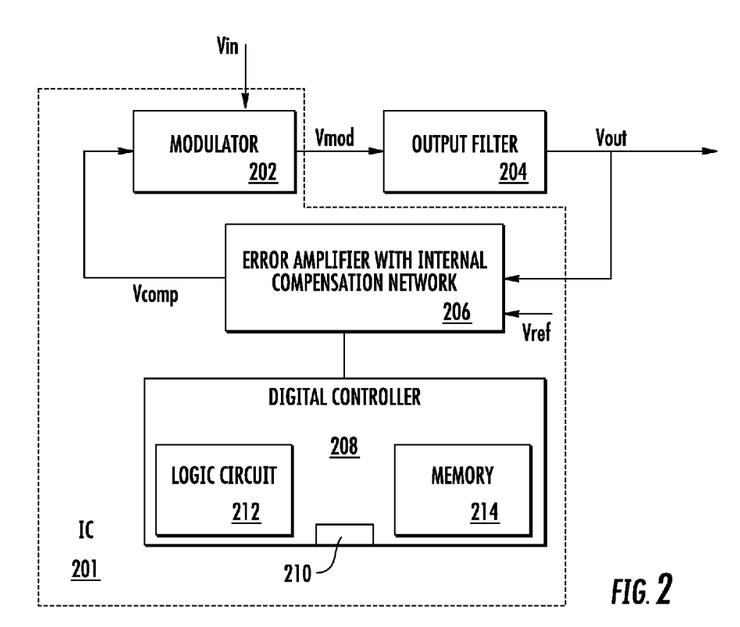
FIG. 2 is a block diagram of one embodiment of an exemplary voltage regulator integrated circuit coupled to an output filter.

FIG. 2 is a high level block diagram of one exemplary embodiment of a voltage regulator IC 201 coupled to an output filter 204. The voltage regulator IC 201 includes a modulator 202, a reference voltage Vref, an error amplifier with an internal analog compensation network 206, and a digital controller 208. The output filter 204 is external to the IC. The modulator receives an input voltage, Vin, and a control voltage, Vcomp. Note that for discussion of this example, the modulator 202 includes power switches to switch Vmod between 2 input levels, Vin and ground. Based in part on Vcomp, the modulator 202 adjusts the frequency and duty cycle of Vin and ground applied to Vmod, as described in more detail below. The modulated voltage, Vmod, is then filtered by the output filter 204 to suppress alternating current (AC) noise in the Vmod signal. The output voltage of the voltage regulator IC 201, Vout, is the filtered Vmod signal.

A sense voltage proportional with the output voltage, Vout, is supplied to the error amplifier with an internal compensation network 206. The feedback signal, Vcomp, is produced based on the relationship between Vref and Vout. The error amplifier with its internal compensation network 206 may also adjust Vcomp based on sensed current into Vout, not shown on these drawings. In this way, the error amplifier with its internal compensation network 206 provides a control loop to adjust the switching frequency and/or pulse widths of the modulator 202 to maintain the output voltage, Vout, at its target regulated value. The compensation network within 206 is selectably configured with specific gain and phase characteristics to meet a desired accuracy and response time to load or other variations.

In particular, the digital controller 208 provides switch control signals to the switches of the internal compensation network 206 to set values for variable components (e.g. resistors and capacitors) of the internal compensation network. Additionally, the digital controller 208 can provide control signals to the internal compensation network 206 to set the value by which a copy of the load current, Idroop, is scaled. The scaled copy of the load current is used to specify an active voltage positioning where the output voltage is reduced by a fixed ratio to the load current. This aids in maintaining Vout within minimum and maximum limits under conditions of sudden load applications or releases, As described in more detail below, the internal compensation network 206 includes variable components, such as, but not limited to arrays of resistors and capacitors which can be switched in and out to adjust the resistive and capacitive values of the internal compensation network 206. Other variable components can include, for example, amplifiers having user configurable amplification values. The voltage regulator IC 201 includes address and data buses which enable the digital controller 208 to provide control signals to specific components, such as digitally controlled switches, to modify values in the internal compensation network 206.

The digital controller 208 includes an interface or input 210 to receive input from a user. For example, the user can input specific resistive and/or capacitive values for the internal compensation network 206 via the input 210, which can include a serial or parallel digital interface. A logic circuit 212 in the digital controller 208 may output command signals to modify the variable values of the internal compensation network 206 based on the user input. Thus, the user can write different values into the memory 214 via the input 210 and the logic circuit 212 in turn adjusts the values of the respective components. Memory 214 may include non-volatile memory or one time programmable (OTP) memory, such as, but not limited to, an Electrically Erasable Programmable Read-Only Memory (EEPROM), EPROM, flash, programmable fuses, etc. In this way, the values may be automatically loaded when the voltage regulator IC 201 is powered on. Alternatively, or in addition to storing the values, the variable values of the internal compensation network 206 can be modified over digital input 210 during operation. Hence, via the interface 210 the internal compensation can be changed by digital programming during testing, or by the user during set-up, or during the operation of the voltage regulator IC 201

Figure 3:
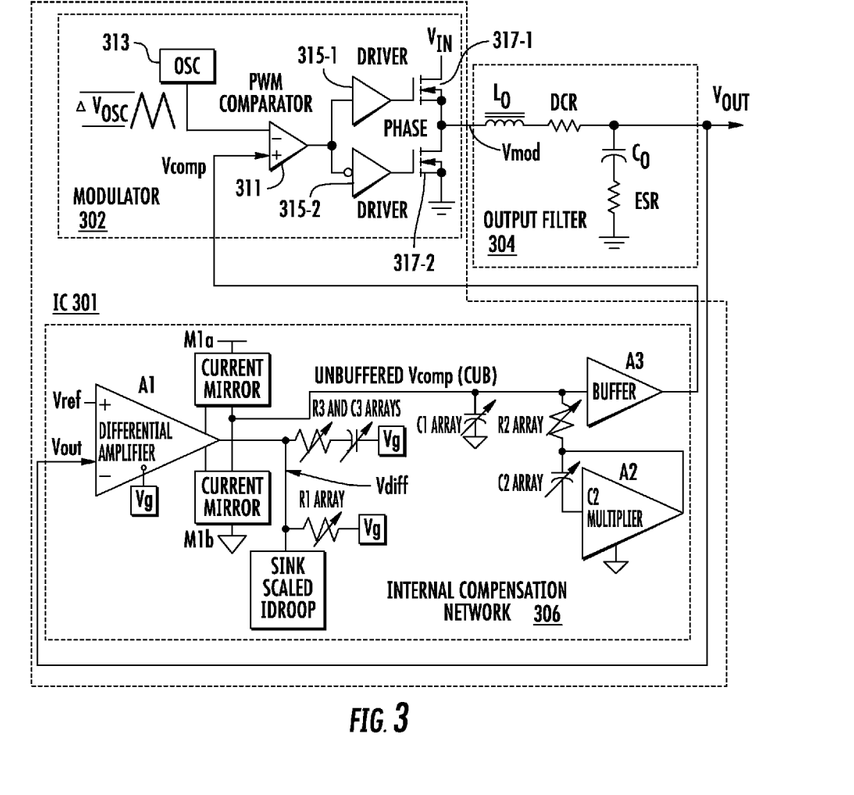
FIG. 3 is a circuit diagram of one embodiment of an exemplary voltage regulator integrated circuit coupled to an output filter.

FIG. 3 is a circuit diagram of one embodiment of an exemplary voltage regulator IC 301 coupled to an output filter 304. The exemplary voltage regulator IC 301 in FIG. 3 includes a modulator 302 and an error amplifier with programmable internal analog compensation network 306. It is to be understood that the error amplifier is coupled to the internal programmable analog compensation network. However, for purposes of explanation, the error amplifier and internal programmable analog compensation network are described in places herein as a single unit. Thus, the designation "Internal Compensation Network 306" will include the error amplifier A1 hereinafter. In addition, for purposes of explanation, the digital controller is not depicted in FIG. 3. However, it is to be understood that a digital controller can be coupled to the internal compensation network 306 as described above with respect to FIG. 2.

As shown in FIG. 3, the output voltage Vout is provided to a first input of an error or difference amplifier A1 in the internal compensation network 306. A reference voltage, Vref, is also supplied to a second input of the error amplifier A1. The error amplifier A1 produces a difference voltage, Vdiff, based on a comparison of the reference voltage, Vref, with the output voltage, Vout. In this embodiment, the difference voltage, Vref, is relative to a local ground, Vg. The local ground, Vg, is generated between a single input supply, such as +5V, and ground. Thus, the local ground, Vg, obviates the need for both + and − input supplies, in this embodiment, and voltage signals can be swung in both polarities around the local ground, Vg.

The difference voltage, Vdiff, is impressed across a variable resistor array R1 and a series combination of a capacitor array C3 and another resistor array R3. A scaled and inverted copy of the load current, Idroop, is also applied to Vdiff. The current out of the error amplifier A1, which also drives R1, C3-R3, and Idroop, is inverted and scaled through current mirrors M1$a$ and M1$b$ to drive the unbuffered Vcomp (also referred to herein as Cub). Also connected to Cub is another capacitor array C1, a series combination of an additional capacitor array C2 with capacitance multiplier A2 and resistor array R2, and the input of a voltage buffer amplifier A3. The buffer amplifier A3 has a predetermined gain, such as, but not limited to unity gain, and is used so that impedance of the modulator or other load is not impressed across nor changes the impedance of the internal compensation components such as C1 or R2 and C2.

The selected values of the capacitor arrays C1, C2, C3 and the selected values of the resistor arrays R1, R2, R3 of the internal compensation network of 306 set the gain and phase characteristics of the control loop of the switching voltage regulator. In other words, each array provides a range of possible programmable component values and the user selects respective values of the arrays to set the desired gain and phase characteristic. In addition, other components may influence the phase and/or gain. For example, the current mirrors M1$a$ and M1$b$ may have gain and, in some embodiments, a current amplifier A2 is included with the capacitor array C2 to multiply the value of the capacitor array C2.

Figure 7:
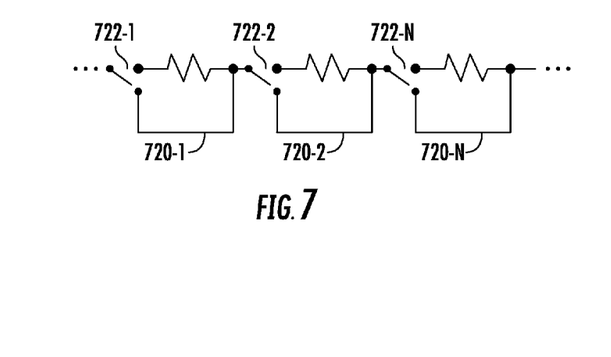
FIG. 7 is a circuit diagram depicting a plurality of resistors coupled in series via a plurality of switches.
Figure 8:
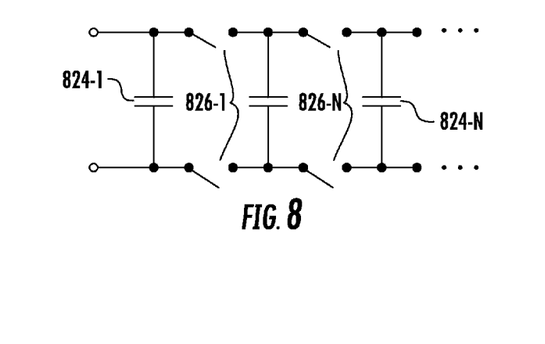
FIG. 8 is a circuit diagram depicting a plurality of capacitors coupled in parallel via a plurality of switches.

Each array in this embodiment includes a plurality of similar components having different values which can be switched in and out based on control signals received from a digital controller. For example, FIG. 7 depicts a plurality of resistors 720-1 . . . 720-N coupled in series via a plurality of digitally controlled single pole double throw switches 722-1 . . . 722-N. In this way, each resistor 720 can be switched in and out independently of the other resistors 720. Similarly, FIG. 8 depicts a plurality of capacitors 824-1 . . . 824-N coupled in parallel via a plurality of digitally controlled double pole single throw switches 826-1 . . . 826-N. It is to be understood that the switching arrangements shown in FIGS. 7 and 8 are provided by way of example only and not by way of limitation. In particular, it is to be understood that other switching arrangements and/or types of switches can be used in other embodiments. Additionally, it is to be understood that resistors can be coupled in parallel or series and capacitors can be coupled in parallel or series in a given array.

In some embodiments, each selectable component (e.g. resistor or capacitor) in a respective array is set to a constant percent higher than the component having the next lower value. For example, a resistor array could be implemented having resistors with respective resistance values of 1000 Ohms, 1100, Ohms, 1210 Ohms, 1331 Ohms, etc. Thus, in such an embodiment, a nominal step value of 10% is used. Using a constant step value percentage helps achieve a constant accuracy of actual value verses desired value.

Returning to FIG. 3, the compensation voltage, Vcomp, is output from the internal compensation network 306 and input to a first input of Pulse Width Modulation (PWM) comparator 311. A signal, ΔVosc, from an oscillator 313 is provided to a second input of the PWM comparator 311. The PWM comparator 311 outputs a signal which controls the drivers 315-1 and 315-2 based on the comparison of Vcomp and ΔVosc. Each of the drivers 315-1 and 315-2 in turn switches the respective transistor 317-1 or 317-2 on and off based on the signal from the PWM comparator 311. Switching on and off the transistors 317-1 and 317-2 modulates the input voltage Vin, as known to one of skill in the art. The modulated voltage, Vmod, is output at the phase node and passes through the output filter 304.

In particular, the output filter 304 includes an output inductor $L_O$ and an output capacitor $C_O$. Also shown in FIG. 3 are the direct current (DC) resistance (DCR) of the output inductor $L_O$ and the total Equivalent Series Resistance (ESR) of the output capacitor $C_O$. The output of the output filter 304 is the regulated output voltage, Vout, which is provided to an electronic circuit or other load as described above with respect to FIG. 1. It is to be understood that the circuit diagram shown in FIG. 3 is provided by way of example only and that other circuit configurations for the modulator 302 (e.g. current mode control, hysteretic variable frequency control, PFM control, etc.), output filter 304, and/or internal programmable analog compensation network 306 can be used in other embodiments.

Figure 4:
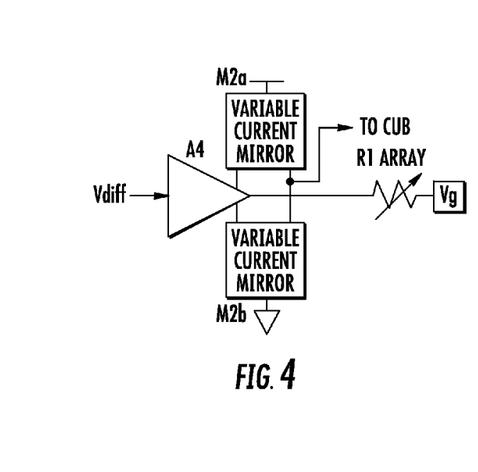
FIG. 4 is a circuit diagram of one embodiment of an exemplary amplification circuit for a resistor array.

For example, in some embodiments, additional components are included to multiply the current through the resistor array R1. In particular, the resistor array R1 may require higher accuracy and finer steps than other components as it sets the DC accuracy of Vout with a given Idroop. Thus, in some embodiments, the resistor array R1 includes a relatively large array of resistors. In other embodiments, the number of resistors in the resistor array R1 is reduced by augmenting the resistor array R1 with another amplifier A4 and variable current mirrors M2a/M2b, as shown in FIG. 4. That is, in FIG. 4, the resistor array R1 is driven by an independent amplifier, A4, which receives as input the different voltage, Vdiff. The current through the resistor array R1 is multiplied by current mirrors M2a and M2b before connecting to unbuffered COMP, Cub. Increasing the gain of M2a and M2b effectively lowers the needed value of resistor array R1. For example, to achieve 280 steps of effective values of resistor array R1, M2a and M2b could be given 7 gain steps and the resistor array R1 could have 40 resistor value steps as opposed to the resistor array R1 having 280 resistor value steps.

Additionally, in some embodiments, it is desirable to clamp the capacitor array C2 to a voltage near its normal operating point. For example, when a load on Vout is released suddenly, stored inductor energy may push Vout above the regulation point. The error amplifier A1 will drive Vcomp down to try to shut off PWM action as long as Vout stays high. This charges the capacitor array C2 to a lower value than when in normal operation. The resistor array R2 and capacitor array C2 generally have a relatively long time constant. Hence, when Vout comes back down and the control loop wants to generate PWMs again, it may take some time for Vcomp to return to its normal operating point which can generate an undesired dip in Vout. Thus, in some embodiments, a voltage clamp is included to clamp the capacitor array C2 to a voltage near its normal operating point so the dip in Vout can be reduced or removed.

Furthermore, when the voltage regulator changes mode, such as from discontinuous to continuous conduction mode, the PWM width may have to also abruptly change as a result. If it does not, Vout may have a dip or a bump up. An abrupt PWM width change is accomplished, in some embodiments, by modifying the Cub voltage. In particular, voltage can be added or removed on the capacitor array C2 when needed, in some embodiments. The amount removed or added can be a calculated value given knowledge of load current and system characteristics. In other embodiments, the amount removed or added can be a preset increase for a given mode change.

Figure 5:
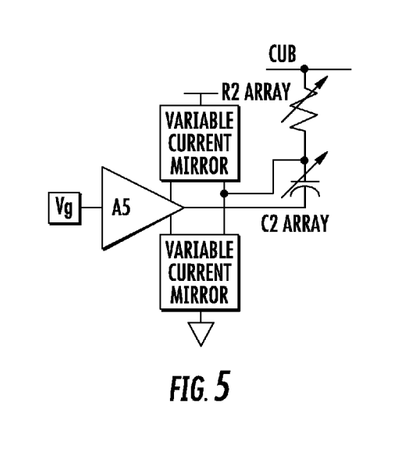
FIG. 5 is a circuit diagram of one embodiment of an exemplary amplification circuit for a capacitor array.
Figure 6:
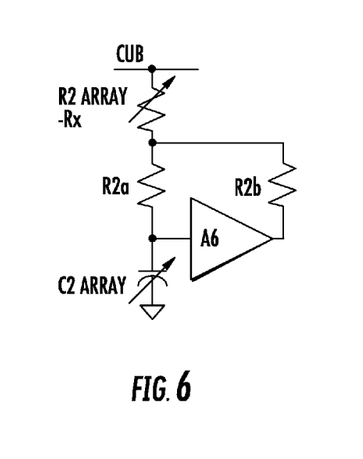
FIG. 6 is a circuit diagram of one embodiment of another exemplary amplification circuit for a capacitor array.

In addition, in some embodiments, the capacitor array C2 is the largest capacitor array in the internal compensation network 306. Thus, the capacitor array C2 may need additional multiplication to achieve the desired value. FIGS. 5 and 6 show respective schemes for providing additional multiplication to achieve the desired value of the capacitor array C2.

FIG. 5 depicts a current multiplier in which the capacitor array C2 is coupled to an amplifier A5 and the effective value of the capacitor array C2 is multiplied by the current gain of the current mirrors 5a and 5b. In FIG. 6, part of the resistor array R2 is split into two parallel effective resistors R2a to C2 and R2b to a buffered C2 voltage, buffered by a voltage buffer amplifier A6. The ratio of effective capacitance of capacitor array C2 to actual capacitance is 1+the ratio of the effective values of R2a to R2b. The values of R2a and R2b can be variable to multiply the effective range of capacitor array C2. The effective resistance value Rx shown in FIG. 6 is the parallel combination of R2a with R2b.

Figure 9:
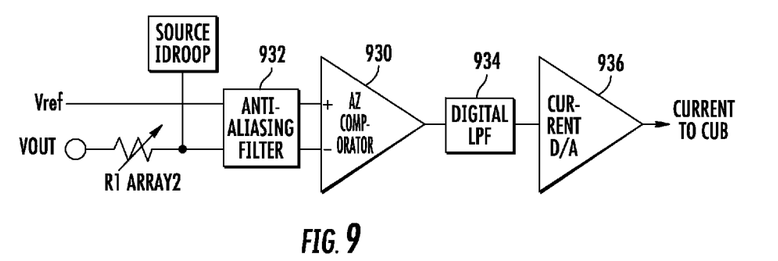
FIG. 9 is a circuit diagram of one embodiment of an exemplary supervisory control loop.

In some embodiments, a second supervisory control loop is used to adjust the primary control loop discussed above with respect to FIG. 3. The supervisory control loop can be used to account for inaccuracies associated with a voltage offset in an amplifier, e.g. A1 or A4, and/or inaccuracies in the current mirror ratios or offsets. One exemplary supervisory control loop is shown in FIG. 9. The loop 900 relies on an accurate comparator 930 to check a sample of Vout against a desired Vout (Vref in FIG. 9). In particular, the sample of the voltage Vout is passed through another resistor array (labeled R1 array2) and an anti-aliasing filter 932. The output of the comparator 930 passes through a digital low pass filter (LPF) 934, which is used to maintain the supervisory loop stable, and a digital to analog (D/A) converter 936. Although a digital LPF 934 is used in this embodiment, it is to be understood that an analog filter, such as a resistor/capacitor (RC) low pass filter can be used in other embodiments. The current output of the converter 936 adjusts a current offset into Cub.

The supervisory loop can be used when the output voltage is not changing. For example, the output voltage could undergo change due to a change in load, a change in requested voltage, Vref, a change in mode of operation, such as continuous conduction to discontinuous conduction, or a change in number of active phases in a multi-phase voltage regulator. If the output voltage is changing the supervisory loop 900 is typically not enabled. If the output voltage is not undergoing a change, the supervisory loop 900 can be enabled to account for inaccuracies as discussed above.

It should be noted that the capacitor values of the internal analog compensation networks discussed above could be distorted by parasitics if connected to an outside pin for testing. Hence, in some embodiments, internal test apparatus/circuitry is included in the integrated circuit. For example, using internal transmission gate switches, not shown, the Cub to COMP buffer A3 can be used to buffer any internal signals and can be connected to an outside pin. Internal currents can be generated for checking resistor and capacitor values of the various arrays and transmission gate switches can be used to disconnect components from normal configuration and to connect for testing instead. For example, in one embodiment, to test capacitor array C1 in FIG. 3, the input to capacitor array C1 and buffer A3 can be disconnected from all other components. Then the buffer A3 can be connected to an external pin and an internal pull-up current can be applied to capacitor array C1 to observe the rise time on the external pin. Similarly, the pull-up current could itself be calibrated by connecting directly to the external pin with everything else disconnected.

Figure 10:
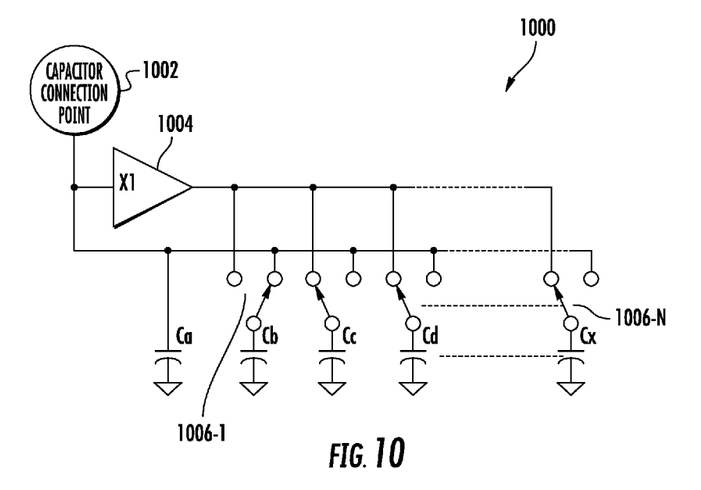
FIG. 10 is a circuit diagram of another embodiment of an exemplary capacitor array In accordance with common practice, the various described features are not drawn to scale but are drawn to emphasize specific features relevant to the exemplary embodiments.

FIG. 10 is a circuit diagram of another embodiment of an exemplary capacitor array 1000. Capacitor array 1000 includes a plurality of capacitors (Ca . . . Cx) and a plurality of switches 1006-1 . . . 1006-N. It is sometimes desirable to change compensation capacitor values dynamically. For example, a multiphase converter changes the number of active phases in response to a load increase, load decrease, or a requested change in operating mode. The capacitor value changes are made by using switches 1006-1 . . . 1006-N to connect or disconnect capacitors Cb . . . Cx to a common capacitor connection point 1002. It is beneficial for previously unconnected capacitors to be at the voltage of already connected capacitors when connected. In this way, the newly connected capacitors do not cause a flow of current into or out of the capacitor connection point 1002.

Hence, in the exemplary array 1000, the unconnected or unused capacitors that may undergo a dynamic change in value are driven with a buffer 1004 to have equal voltage to the capacitors that are already in use. Single pole, double throw switches 1006-1 . . . 1006-N are used to switch capacitors Cb . . . Cx between the common connection point 1002 and the output of the buffer 1004.

Example Embodiments

Example 1 includes a voltage regulator integrated circuit comprising: a control circuit driving at least one power switch to provide a regulated voltage at an output of an inductor/capacitor (LC) circuit coupled to the at least one power switch; an error amplifier having a first input coupled to a feedback signal representative of the regulated output voltage and a second input coupled to a reference signal; and a compensation network coupled to an output of the error amplifier and configured to provide a compensation voltage; wherein the compensation network includes at least one digitally programmable resistor array and at least one digitally programmable capacitor array, each array providing a plurality of user selectable component values; wherein the control circuit includes a pulse modulator configured to modulate an input voltage based on the compensation voltage.

Example 2 includes the voltage regulator integrated circuit of Example 1 further comprising a digital controller, the digital controller comprising: an input configured to receive signals indicating user input; and a logic circuit configured to control the compensation network to select respective component values provided by the at least one resistor array and the at least one capacitor array based on the received signals.

Example 3 includes the voltage regulator integrated circuit of Example 2, wherein the at least one resistor array comprises a plurality of resistors, each having a respective value, and a plurality of switches; wherein the at least one capacitor array comprises a plurality of capacitors, each having a respective value, and a plurality of switches; and wherein the plurality of switches in each array are controlled by the logic circuit.

Example 4 includes the voltage regulator integrated circuit of any of Examples 1-3, wherein the error amplifier is configured to output a difference voltage based on a comparison of the reference voltage and the feedback signal; wherein the compensation network comprises: first and second current mirrors configured to scale and invert current output from the error amplifier, the scaled and inverted current driving an unbuffered compensation voltage; a first resistor array; a first series combination of a second resistor array and a first capacitor array, the difference voltage impressed across the first resistor array and the first series combination; a second capacitor array; a second series combination of a third resistor array and a third capacitor array, the second capacitor array and the second series combination coupled to receive the unbuffered compensation voltage; and a voltage buffer amplifier having an input coupled to receive the unbuffered compensation voltage and an output providing the compensation voltage to the pulse modulator; wherein the respective component values of the first resistor array, second resistor array, third resistor array, first capacitor array, second capacitor array, and third capacitor array set gain and phase characteristics.

Example 5 includes the voltage regulator integrated circuit of Example 4, wherein the third capacitor array is clamped to a predetermined voltage level.

Example 6 includes the voltage regulator integrated circuit of any of Examples 4-5, further comprising a current multiplier coupled to the third capacitor array to multiply the effective capacitance value of the third capacitor array.

Example 7 includes the voltage regulator integrated circuit of Example 6, wherein the current multiplier comprises a current amplifier having an input coupled to a first end of the third capacitor array and an output coupled to a second end of the third capacitor array.

Example 8 includes the voltage regulator integrated circuit of any of Examples 4-7, further comprising: an amplifier coupled between the first resistor array and the output of the error amplifier; and third and fourth current mirrors coupled to the amplifier and configured to multiply current through the first resistor array.

Example 9 includes the voltage regulator integrated circuit of any of Examples 4-8, wherein the difference voltage is generated by the error amplifier relative to a local ground; the local ground being generated between a single input supply and ground.

Example 10 includes the voltage regulator integrated circuit of any of Examples 1-9, wherein each of the plurality of user selectable values in at least one resistor array of the plurality of resistor arrays or at least one capacitor array of the plurality of capacitor arrays is set to a constant percent higher than the next lower value.

Example 11 includes a system comprising: a power source configured to provide a voltage signal; a voltage regulator configured to regulate the voltage signal from the power source; and a load coupled to the voltage regulator to receive the regulated voltage signal; wherein the voltage regulator includes an integrated circuit comprising: a pulse modulator configured to modulate an input voltage based on a compensation voltage; a difference amplifier configured to output a difference voltage based on a comparison of a reference voltage and a feedback signal representative of a regulated output voltage at an output of an inductor/capacitor (LC) circuit; and a compensation network coupled to an output of the difference amplifier and configured to provide the compensation voltage; wherein the compensation network includes at least one digitally programmable resistor array and at least one digitally programmable capacitor array, each array providing a plurality of user selectable component values to set gain and phase characteristics.

Example 12 includes the system of Example 11, wherein the integrated circuit further comprises: a digital controller having an input configured to receive signals indicating user input, the digital controller further comprising a logic circuit configured to control the compensation network to select respective component values provided by the at least one digitally programmable resistor array and the at least one digitally programmable capacitor array based on the received signals.

Example 13 includes the system of Example 12, wherein, the at least one resistor array includes a plurality of resistors; wherein the at least one capacitor array includes a plurality of capacitors; wherein the at least one resistor array further comprises a plurality of switches responsive to the logic circuit; and wherein the at least one capacitor array further comprises a plurality of switches responsive to the logic circuit.

Example 14 includes the system of any of Examples 11-13, wherein the compensation network comprises: first and second current mirrors configured to scale and invert current output from the difference amplifier, the scaled and inverted current driving an unbuffered compensation voltage; a first resistor array having a plurality of resistors and a plurality of switches; a first series combination of a second resistor array and a first capacitor array, the difference voltage impressed across the first resistor array and the first series combination; a second capacitor array having a plurality of capacitors and a plurality of switches; a second series combination of a third resistor array and a third capacitor array, the second capacitor array and the second series combination coupled to receive the unbuffered compensation voltage; and a buffer having an input coupled to receive the unbuffered compensation voltage and an output providing said compensation voltage; wherein each of the second resistor array and the third resistor array comprises a plurality of resistors and a plurality of switches; wherein the first capacitor array and the third capacitor array each comprises a plurality of capacitors and a plurality of switches; wherein the respective user selectable component values provided by the first resistor array, second resistor array, third resistor array, first capacitor array, second capacitor array, and third capacitor array set the gain and phase characteristics.

Example 15 includes the system of Example 14, further comprising: a current amplifier having an input coupled to a first end of the third capacitor array and an output coupled to a second end of the third capacitor array.

Example 16 includes the system of any of Examples 14-15, further comprising: an amplifier coupled between the first resistor array and the output of the difference amplifier; and third and fourth current mirrors coupled to the amplifier and configured to multiply current through the first resistor array.

Example 17 includes the system of any of Examples 14-16, wherein each of the resistors in at least one of the first, second, and third resistor arrays is set to a constant percent higher than a resistor having the next lower value; and each of the capacitors in at least one of the first, second, and third capacitor arrays is set to a constant percent higher than a capacitor having the next lower value.

Example 18 includes the system of any of Examples 11-17, wherein the difference voltage is generated by the difference amplifier relative to a local ground; the local ground being generated between a single input supply and ground.

Example 19 includes a method of providing a regulated output voltage, the method comprising: comparing a reference voltage to a feedback signal representative of the regulated output voltage in a difference amplifier in an integrated circuit to produce a difference voltage; producing a compensation voltage based on the difference voltage in a compensation network in the integrated circuit, the compensation network including at least one digitally programmable resistor array and at least one digitally programmable capacitor array, each array providing a plurality of user selectable component values to set gain and phase characteristics; and modulating an input voltage with a pulse modulator in the integrated circuit based on the compensation voltage.

Example 20 includes the method of Example 19, further comprising: selecting component values for each array via a digital controller in the integrated circuit based on user input received at the digital controller.

Although specific embodiments have been illustrated and described herein, it will be appreciated by those of ordinary skill in the art that any arrangement, which is calculated to achieve the same purpose, may be substituted for the specific embodiments shown. For example, switched capacitor networks can be used, in some embodiments, to simulate resistors. Therefore, it is manifestly intended that this invention be limited only by the claims and the equivalents thereof.

What is claimed is:

1. A voltage regulator integrated circuit comprising:
   a control circuit driving at least one power switch to provide a regulated voltage at an output of an inductor/capacitor (LC) circuit coupled to the at least one power switch;
   an error amplifier having a first input coupled to a feedback signal representative of the regulated output voltage and a second input coupled to a reference signal; and
   a compensation network coupled to an output of the error amplifier and configured to provide a compensation voltage;
   wherein the compensation network includes at least one digitally programmable resistor array and at least one digitally programmable capacitor array, each array providing a plurality of user selectable component values;
   wherein the compensation network further comprises a capacitance multiplier configured to multiply a value of the at least one digitally programmable capacitor array;
   wherein the control circuit includes a pulse modulator configured to modulate an input voltage based on the compensation voltage.

2. The voltage regulator integrated circuit of claim 1 further comprising a digital controller, the digital controller comprising:
   an input configured to receive signals indicating user input; and
   a logic circuit configured to control the compensation network to select respective component values provided by the at least one resistor array and the at least one capacitor array based on the received signals.

3. The voltage regulator integrated circuit of claim 2, wherein the at least one resistor array comprises a plurality of resistors, each having a respective value, and a plurality of switches;
   wherein the at least one capacitor array comprises a plurality of capacitors, each having a respective value, and a plurality of switches; and
   wherein the plurality of switches in each array are controlled by the logic circuit.

4. The voltage regulator integrated circuit of claim 1, wherein the error amplifier is configured to output a difference voltage based on a comparison of the reference voltage and the feedback signal;
   wherein the compensation network comprises:
   first and second current mirrors configured to scale and invert current output from the error amplifier, the scaled and inverted current driving an unbuffered compensation voltage;
   a first resistor array;
   a first series combination of a second resistor array and a first capacitor array, the difference voltage impressed across the first resistor array and the first series combination;
   a second capacitor array;
   a second series combination of a third resistor array and a third capacitor array, the second capacitor array and the second series combination coupled to receive the unbuffered compensation voltage; and
   a voltage buffer amplifier having an input coupled to receive the unbuffered compensation voltage and an output providing the compensation voltage to the pulse modulator;

wherein the respective component values of the first resistor array, second resistor array, third resistor array, first capacitor array, second capacitor array, and third capacitor array set gain and phase characteristics.

5. The voltage regulator integrated circuit of claim 4, wherein the third capacitor array is clamped to a predetermined voltage level.

6. The voltage regulator integrated circuit of claim 4, wherein the capacitance multiplier is coupled to the third capacitor array to multiply the effective capacitance value of the third capacitor array.

7. The voltage regulator integrated circuit of claim 6, wherein the current multiplier comprises a current amplifier having an input coupled to a first end of the third capacitor array and an output coupled to a second end of the third capacitor array.

8. The voltage regulator integrated circuit of claim 4, further comprising:
an amplifier coupled between the first resistor array and the output of the error amplifier; and
third and fourth current mirrors coupled to the amplifier and configured to multiply current through the first resistor array.

9. The voltage regulator integrated circuit of claim 4, wherein the difference voltage is generated by the error amplifier relative to a local ground; the local ground being generated between a single input supply and ground.

10. The voltage regulator integrated circuit of claim 1, wherein each of the plurality of user selectable values in at least one resistor array of the plurality of resistor arrays or at least one capacitor array of the plurality of capacitor arrays is set to a constant percent higher than the next lower value.

11. A system comprising:
a power source configured to provide a voltage signal;
a voltage regulator configured to regulate the voltage signal from the power source; and
a load coupled to the voltage regulator to receive the regulated voltage signal;
wherein the voltage regulator includes an integrated circuit comprising:
a pulse modulator configured to modulate an input voltage based on a compensation voltage;
a difference amplifier configured to output a difference voltage based on a comparison of a reference voltage and a feedback signal representative of a regulated output voltage at an output of an inductor/capacitor (LC) circuit; and
a compensation network coupled to an output of the difference amplifier and configured to provide the compensation voltage;
wherein the compensation network includes at least one digitally programmable resistor array and at least one digitally programmable capacitor array, each array providing a plurality of user selectable component values to set gain and phase characteristics
wherein the compensation network further comprises a capacitance multiplier configured to multiply a value of the at least one digitally programmable capacitor array.

12. The system of claim 11, wherein the integrated circuit further comprises:
a digital controller having an input configured to receive signals indicating user input, the digital controller further comprising a logic circuit configured to control the compensation network to select respective component values provided by the at least one digitally programmable resistor array and the at least one digitally programmable capacitor array based on the received signals.

13. The system of claim 12, wherein, the at least one resistor array includes a plurality of resistors;
wherein the at least one capacitor array includes a plurality of capacitors;
wherein the at least one resistor array further comprises a plurality of switches responsive to the logic circuit; and
wherein the at least one capacitor array further comprises a plurality of switches responsive to the logic circuit.

14. The system of claim 11, wherein the compensation network comprises:
first and second current mirrors configured to scale and invert current output from the difference amplifier, the scaled and inverted current driving an unbuffered compensation voltage;
a first resistor array having a plurality of resistors and a plurality of switches;
a first series combination of a second resistor array and a first capacitor array, the difference voltage impressed across the first resistor array and the first series combination;
a second capacitor array having a plurality of capacitors and a plurality of switches;
a second series combination of a third resistor array and a third capacitor array, the second capacitor array and the second series combination coupled to receive the unbuffered compensation voltage; and
a buffer having an input coupled to receive the unbuffered compensation voltage and an output providing said compensation voltage;
wherein each of the second resistor array and the third resistor array comprises a plurality of resistors and a plurality of switches;
wherein the first capacitor array and the third capacitor array each comprises a plurality of capacitors and a plurality of switches;
wherein the respective user selectable component values provided by the first resistor array, second resistor array, third resistor array, first capacitor array, second capacitor array, and third capacitor array set the gain and phase characteristics.

15. The system of claim 14, further comprising:
a current amplifier having an input coupled to a first end of the third capacitor array and an output coupled to a second end of the third capacitor array.

16. The system of claim 14, further comprising:
an amplifier coupled between the first resistor array and the output of the difference amplifier; and
third and fourth current mirrors coupled to the amplifier and configured to multiply current through the first resistor array.

17. The system of claim 14, wherein each of the resistors in at least one of the first, second, and third resistor arrays is set to a constant percent higher than a resistor having the next lower value; and
each of the capacitors in at least one of the first, second, and third capacitor arrays is set to a constant percent higher than a capacitor having the next lower value.

18. The system of claim 11, wherein the difference voltage is generated by the difference amplifier relative to a local ground.

19. A method of providing a regulated output voltage, the method comprising:

comparing a reference voltage to a feedback signal representative of the regulated output voltage in a difference amplifier in an integrated circuit to produce a difference voltage;

producing a compensation voltage based on the difference voltage in a compensation network in the integrated circuit, the compensation network including at least one digitally programmable resistor array and at least one digitally programmable capacitor array, each array providing a plurality of user selectable component values to set gain and phase characteristics; and modulating an input voltage with a pulse modulator in the integrated circuit based on the compensation voltage;

wherein producing the compensation voltage comprises multiplying a value of the at least one digitally programmable capacitor array with a capacitance multiplier.

20. The method of claim 19, further comprising:

selecting component values for each array via a digital controller in the integrated circuit based on user input received at the digital controller.

* * * * *